United States Patent

Stein et al.

[11] Patent Number: 6,055,930
[45] Date of Patent: May 2, 2000

[54] APPARATUS FOR MOVING AN ANIMAL RELATED MEANS AND A METHOD THEREFOR

[75] Inventors: Jan Stein, Alvsjo; Benny Ornerfors, Jarfalla, both of Sweden

[73] Assignee: Alfa Laval Agri AB, Tumba, Sweden

[21] Appl. No.: 09/066,307

[22] PCT Filed: Sep. 5, 1996

[86] PCT No.: PCT/SE96/01104

§ 371 Date: Jun. 2, 1998

§ 102(e) Date: Jun. 2, 1998

[87] PCT Pub. No.: WO97/15183

PCT Pub. Date: May 1, 1997

[30] Foreign Application Priority Data

Oct. 27, 1995 [SE] Sweden .................................. 9503793

[51] Int. Cl.⁷ .................................................. A01J 5/017
[52] U.S. Cl. ........................................ 119/14.08; 119/670
[58] Field of Search ............................ 119/14.08, 14.18, 119/14.1, 14.02, 14.01, 670

[56] References Cited

U.S. PATENT DOCUMENTS

| | | |
|---|---|---|
| 4,223,635 | 9/1980 | Akerman . |
| 4,726,322 | 2/1988 | Torsius .................................. 119/14.14 |
| 5,020,477 | 6/1991 | Dessing et al. ....................... 119/14.08 |
| 5,069,160 | 12/1991 | Street et al. .......................... 119/14.08 |
| 5,479,876 | 1/1996 | Street et al. .......................... 119/14.08 |
| 5,784,994 | 7/1998 | Van Der Lely ....................... 119/14.08 |
| 5,791,284 | 8/1998 | Van Der Lely ....................... 119/14.08 |
| 5,862,776 | 1/1999 | Van Den Berg ....................... 119/14.1 |
| 5,934,220 | 8/1999 | Hall et al. ............................. 119/14.08 |
| 5,979,359 | 11/1999 | Hansson ................................ 119/14.08 |

FOREIGN PATENT DOCUMENTS

| | | |
|---|---|---|
| 188303 | 7/1986 | European Pat. Off. . |
| 194729 | 9/1986 | European Pat. Off. . |
| 213660 | 3/1987 | European Pat. Off. . |
| 300115 | 1/1989 | European Pat. Off. . |
| 323875 | 7/1989 | European Pat. Off. . |
| 455305 | 11/1991 | European Pat. Off. . |
| 661517 | 7/1995 | European Pat. Off. . |
| 258554 | 7/1988 | Germany . |
| 4113700 | 10/1992 | Germany . |
| 2272971 | 6/1994 | United Kingdom . |
| WO9423565 | 10/1994 | WIPO . |

*Primary Examiner*—Michael J. Carone
*Assistant Examiner*—James S. Bergin
*Attorney, Agent, or Firm*—Hovey, Williams, Timmons & Collins

[57] ABSTRACT

An apparatus for automatically moving at least one animal related item in relation to the body of an animal comprises a position indicator adapted to be applied to at least one teat of the udder, a sensor adapted to sense a position of the position indicator, a controller adapted to be responsive to a signal from the sensor regarding the position, and an actuator adapted to move the animal related item in relation to the body in response to a signal from the controller. The invention also relates to a method for automatically moving at least one animal related item in relation to the body of an animal.

33 Claims, 3 Drawing Sheets

APPARATUS FOR MOVING AN ANIMAL RELATED MEANS AND A METHOD THEREFOR

BACKGROUND OF THE INVENTION

1. Field of the Invention

The present invention relates to an apparatus for automatically moving at least one animal related means in relation to the body of an animal, comprising a sensing means, a control means and an actuation means.

The invention also relates to a method of automatically moving such an animal related means.

2. Background Art

An apparatus and a method of this kind, respectively, is known from EP-A-0 323 875, comprising a sensor in the form of a periscope-like ultrasonic transmitter/receiver, which scans horizontally in order to find the teats of an animal to be milked. This kind of sensor has proven to suffer from the drawback that the sensor sometimes has problems to find short teats or teats being placed sidewardly on the udder.

Other known periscope-like sensors being equipped with a laser transmitter/receiver suffer from the same drawback.

A milking robot utilising the combination of a metal plate connected to the animal's back and a sensor placed above the animal for determination of the location of the udder is known from EP-A-0 188 303. This milking robot has a serious drawback in that the exact location of the teats cannot be determined, since the locating operation relies only on historical data regarding the specific animal. The data are computed to serve as basis for calculation of the location of the teats.

SUMMARY OF THE INVENTION

The object of the invention is to improve the success-rate of automatically finding at least one teat of an animal in order to accomplish automatic moving of an animal related means in relation to the body of an animal.

This object is obtained by an apparatus as initially defined, which is characterised in that a position indicating means is adapted to be applied to at least one teat of the udder, said sensing means is adapted to sense a position of said position indicating means, said control means is adapted to be responsive to a signal from said sensing means regarding said position, and said actuation means is adapted to move said animal related means in relation to said body in response to a signal from said control means. Application of a position indicating means on at least one teat of the udder, which position indicating means is particularly chosen to suit the sensing means, enables easy location of the teat.

According to one alternative, the position indicating means is adapted to be applied to the teat in such a way that it remains only temporarily on the teat.

According to another alternative, the position indicating means is adapted to be applied to the teat in such a way that it remains permanently on the teat.

When viewing teats with a video camera but without position indicating means, there are sometimes problems to trace the teats, since a bad contrast of the teats in relation to the background often occurs e.g. for the reason that the teats often have a camouflage-like pattern rather than a uniform colour.

A teat may more easily be traced after application of a position indicating means in the form of a suitable liquid onto the teat.

It may alternatively be necessary to enhance the contrast of the teat in relation to the background. In such a case, said position indicating means may be a powder, preferably light coloured, such as milk powder. As an alternative, said position indicating means may be a fluorescent material. The described position indicating means are to be applied at least once to the teat before moving the animal related means in relation to the animal's body.

There are, of course, other possibilities than using a video camera in order to find the teats of an animal. Accordingly, an electric charge sensing means may be used as sensing means while utilizing a position indicating means in the form of an ionized liquid. Also this position indicating means is to be applied at least once to the teat before moving the animal related means in relation to the body of the animal.

According to a further alternative, said position indicating means may be a smell producing substance and said sensing means may be an olfactory sensor, such as a biosensor. Also this position indicating means is to be applied at least once to the teat before moving the animal related means in relation to the body.

Another possibility would be to apply a position indicating means in the form of a signal reflecting means, such as a metal plate or a micro chip, and to use a signal transmitter/receiver means as the sensing means. The described position indicating means is intended to be placed permanently on or in the teat and there is therefore no need for applying this kind of position indicating means before each time the animal related means is to be moved in relation to the body of the animal. Of course, other permanent position indicating means would be possible to apply, such as soft teat sleeves of an easy identifiable colour or patter, paint, permanent fluorescent paint, or even tattooed barcodes.

Accordingly, said position indicating means may be a substance introduced into a surface layer of the teat and the sensor may be a laser reader.

The animal related means may be anything that can perform an action related to the animal. Accordingly, the animal related means may be a video camera for inspecting the teats, before, during or after milking of the animal.

Alternatively, said animal related means may be a cleaning device, so that the teats or even the whole udder can be cleaned before milking.

As an alternative, said animal related means may be a teat after-treatment means, e.g. a sryay device with a spray-nozzle for spraying iodine on the teats. Also other after-treatment means like a dip bowl or a dip flask filled with iodine would be possible to use.

As yet another alternative, said animal related means may be at least one teatcup. Preferably, said actuation means is adapted to attach said teatcup onto said teat in response to a signal from said control means.

It is also possible to attach the teatcups one after the other by allowing the actuation means to carry only one teatcup at a time, i.e. after a teatcup has been attached to a teat, the actuation means fetches another teatcup.

According to another alternative, two (regarding sheep and goats) or four (regarding cows) teatcups are carried and moved together by the actuation means, such that the teatcups can be attached to the udder more or less simultaneously.

The above stated object is also achieved by a method as initially defined, which is characterised by applying said position indicating means onto at least one teat of the udder, sensing a position of said position indicating means by means of said sensing means, sending a signal from said sensing means regarding the sensed position to said control means, and sending a signal from said control means to said actuation means to move said animal related means in relation to the body.

Preferably, the method includes checking the need for application of said position indicating means onto a teat before applying said position indicating means onto the teat. This may be needed when having applied said position indicating means to the teat in such a way that it remains only temporarily on the teat, but will not be needed when having applied said position indicating means to the teat in such a way that the it remains permanently on the teat.

BRIEF DESCRIPTION OF THE DRAWINGS

Preferred embodiments of the present invention will now be described with reference to the accompanying drawings in which.

DETAILED DESCRIPTION OF PREFERRED EMBODIMENTS

Figure 1A:
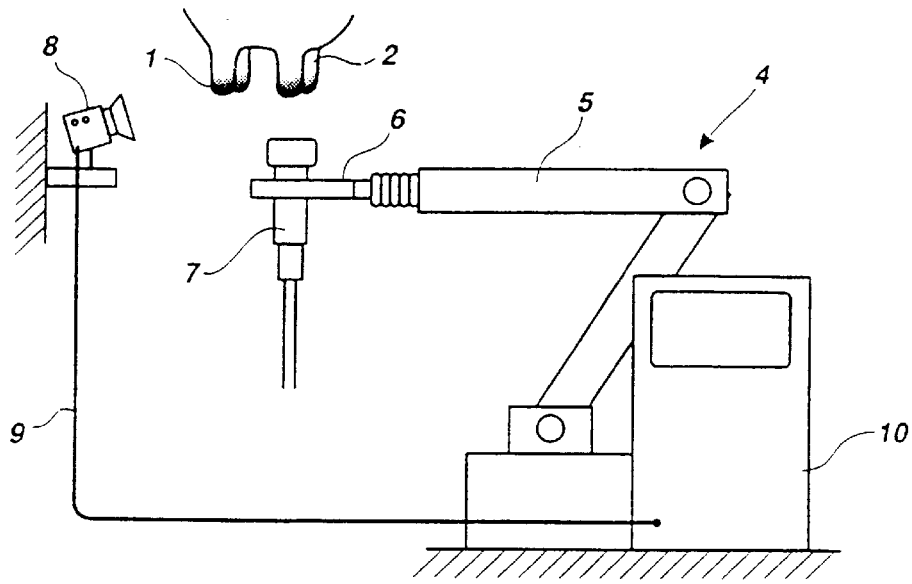
FIG. 1a illustrates schematically an udder and a milking robot for moving an animal related means, in this case a teatcup, and includes an apparatus according to the invention.

FIG. 1a shows schematically an apparatus according to the invention, the apparatus comprising a position indicating means 1 applied to the teats 2 of an animal, such as a cow. An animal related robot 4 provided with actuation means 5 and a gripping means 6 is arranged to automatically perform activities related to the animal by means of an animal related means 7, in FIG. 1a illustrated as a teatcup. Sensing means 8 is placed somewhere in the vicinity of the milking robot, e.g. on a wall, a floor or a bar and is connected via a cable 9 to a control means 10. The control means 10 is, in turn, connected to the actuation means 5. Of course, the connection between the sensing means 8 and the control means 10, and the control means 10 and the actuation means 5, respectively, may be wire-less.

As an alternative, the sensing means 8 may be placed on the actuation means 5 or on the gripping means 6.

The animal related means 7 need not be a teatcup, but may be anything that can perform a preferred action related to the animal. Accordingly, in FIG. 1b the animal related means 7 is shown as a video camera carried by said gripping means 6, in FIG. 1c as a teat cleaning means in the form of two counter rotating brushes, between which the teat is intended to be inserted, whereas in FIG. 1d it is shown as a spray device having a spray-nozzle and in FIG. 1e as a dip bowl, both being suitable for applying a powder or a liquid, such as water or iodine, onto the teats of an animal. The dip bowl may either be made such that it is suitable for applying powder or liquid to one teat at a time or a plurality of teats at a time.

Figure 1B:
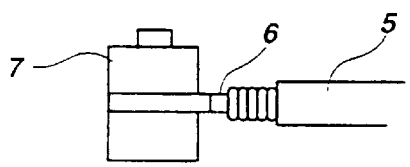
FIG. 1b illustrates a detail of the milking robot shown in FIG. 1a, the animal related means being shown as a video camera.
Figure 1C:
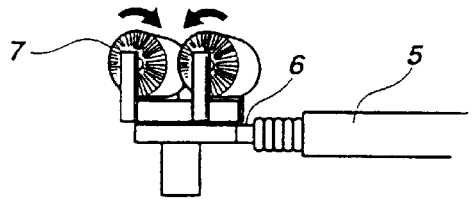
FIG.1c illustrates a detail of the milking robot shown in FIG. 1a, the animal related means being shown as a teat cleaning means.
Figure 1D:
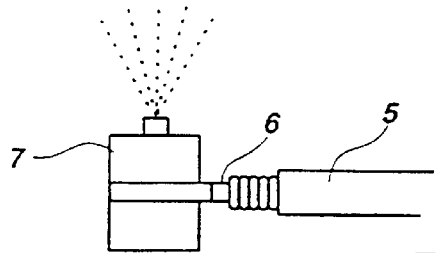
FIG. 1d illustrates a detail of the milking robot shown in FIG. 1a, the animal related means being shown as a spray device with a spray-nozzle.
Figure 2:
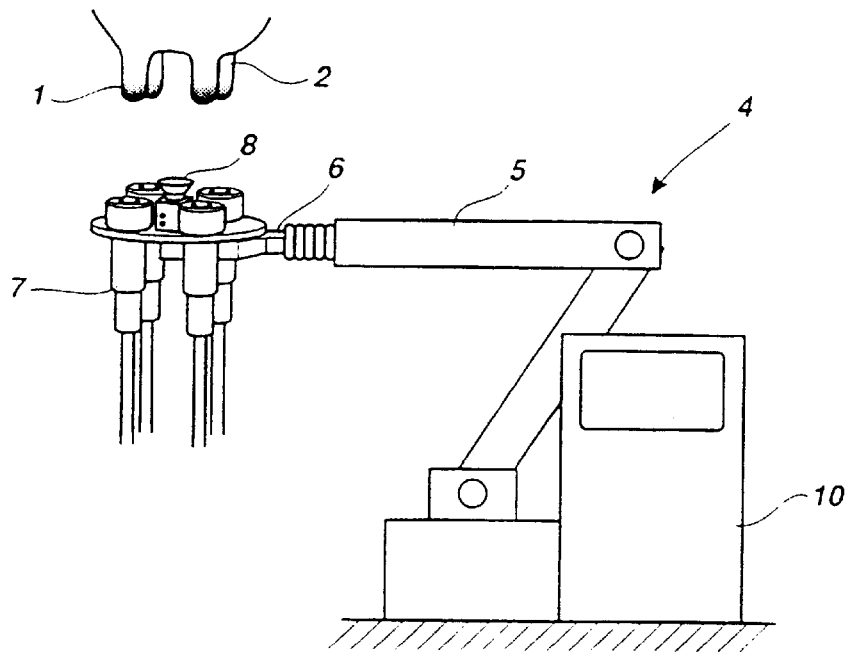
FIG. 2 illustrates schematically an udder and a milking robot for moving four teatcups simultaneously and includes an apparatus according to the invention.

In FIG. 2 the gripping means 6 carries several animal related means 7, such as teatcups, and furthermore the sensing means 8. Of course, the sensing means 8 may be placed on the actuation means 5 or on the griping means 6 or as shown in FIGS. 1a–1d. Means for exact positioning of the teatcups in relation to each other are not shown but are normally necessary.

Of course, also other animal related means 7 may be used, such as a slaughtering tool, a brush for cleaning the fleece of the hide etc. In these cases, historical data regarding the location of different parts of the body of each animal in relation to a teat to be traced may be used to determine where to use the slaughtering tool, where to brush etc.

Figure 3:
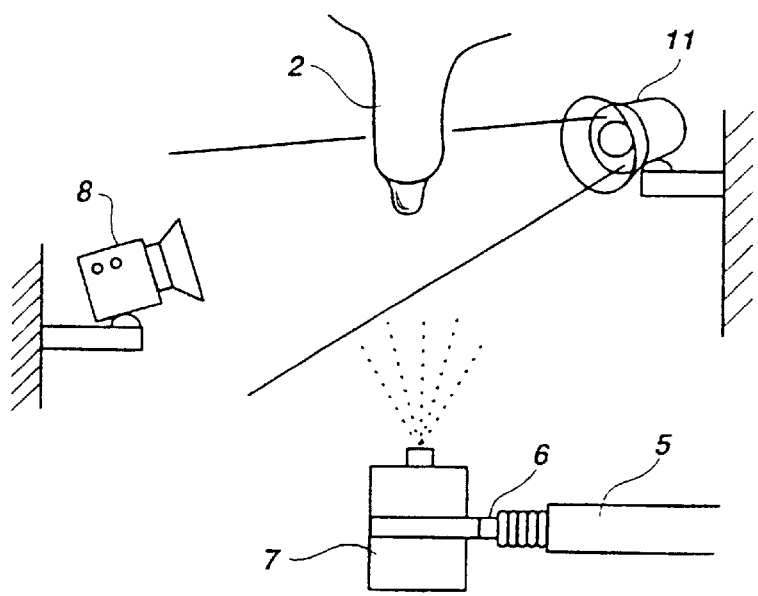
FIG. 3 illustrates schematically a first embodiment of the invention.

FIG. 3 shows a first embodiment of the invention, where the teats 2 are sprayed with a liquid, such as water, by means of the spray device as shown in FIG. 1d, in order to create said position indicating means 1 in the form of a water droplet at the lower end of each teat. A light source 11—a lamp or the sun—illuminates the teats 2 and a sensor 8 in the form of a video camera views the teats. The light will be spread in the water droplets and cause four distinct light reflections at the lower end of each teat, i.e. in the water droplets. The reflections are easily traced by means of the sensing means 8, i.e. the video camera. Of course, the water may include additives for enhancing the reflective effect.

Figure 1E:
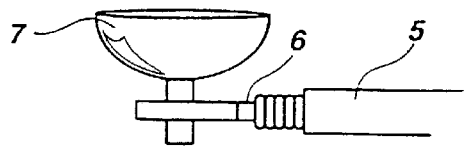
FIG. 1e illustrates a detail of the milking robot shown in FIG. 1a, the animal related means being shown as a dip bowl.
Figure 4:
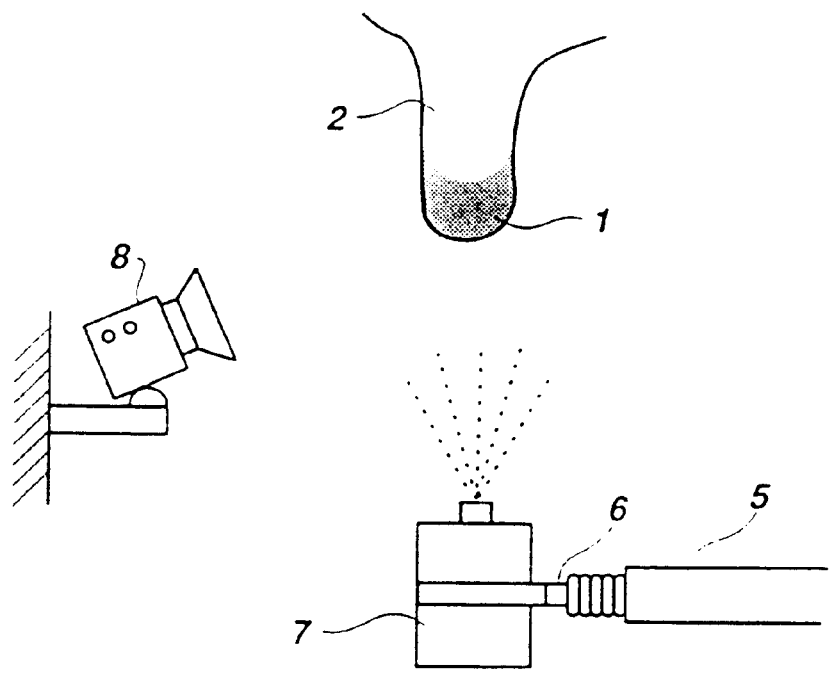
FIG. 4 illustrates schematically a second embodiment of the invention.

In FIG. 4, a second embodiment of the invention is shown, where the end of a teat 2 has had a powder applied thereto to form a coloured or otherwise identifiable position indicating means 1 thereon. The application of powder can be performed by spraying the powder onto the teats by means of a spray nozzle as shown in FIG. 1d or by dipping the teats into a dip bowl as shown in FIG. 1e or a dip flask filled with powder, respectively. Optionally, the teats may initially need to be sprayed with a liquid, such as water, in order to allow the powder to better attach to the teats 2. The powder is suitably a non-toxic and light coloured powder, such as milk powder.

The uniformly coloured teat end is now easily traced by means of a sensing means 8 in the form of a video camera.

According to a third embodiment, the position indicating means 1 is created by applying a fluorescent material onto the teats by spraying or dipping. The fluorescent material may be in solid or liquid form and may be applied temporarily of permanently.

The fluorescent material applied onto the teat end is easily traced by a sensing means 8 in the form of a video camera.

In a fourth embodiment, the position indicating means 1 is formed by applying iodine solution onto the teat end by e.g. spraying or dipping. Iodine is an ionized liquid, which may be traceable by means of a sensor 8 in the form of an electric charge sensing means.

According to a fifth embodiment of the invention, the position indicating means 1 is formed by applying a smell producing substance onto the teat end. The smell producing substance may be traced by means of a sensing means 8 in the form of an olfactory sensor, e.g a bio-sensor. Of course, the smell producing substance may be milk originating and/or left over from a pre-milking procedure.

According to a sixth embodiment of the invention, the position indicating means 1 is formed by applying a blood circulative enhancing substance, such as a liniment, sprayed onto the teats by means of the nozzle 7. Application of such a substance may also stimulate milk ejection, i.e the first flow of milk from the udder down to the teats.

Figure 5:
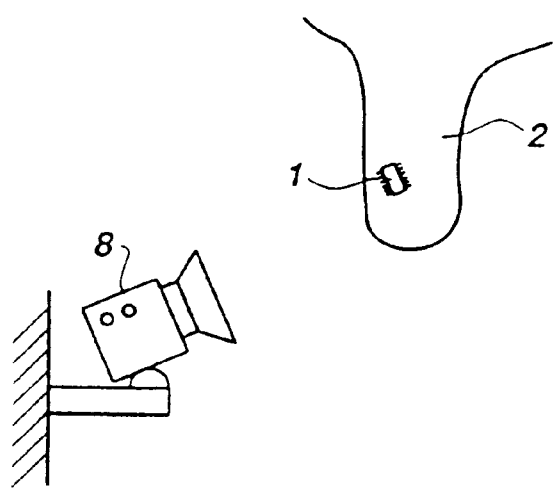
FIG. 5 illustrates schematically a third embodiment of the invention.

FIG. 5 illustrates a seventh embodiment of the invention, where the position indicating means 1 is shown as a signal reflecting means, e.g. a metal plate or a micro chip applied onto or into the teat, near the end thereof. A sensing means 8 in the form of a combined transmitter/receiver sends a signal to the signal reflecting means, which returns the signal to said transmitter/receiver. The position of the teat end, i.e. the signal reflecting means, is now easily traceable.

As an alternative, the signal reflecting means may be a transponder, which contains information regarding the identity of the animal carrying the transponder. Accordingly, it is then possible to use the transponder as identification means and position indicating means, by means of which a transponder around the neck of the animal is superfluous.

Using such a combined position indicating means and transponder, it is only necessary to place the animal in a stall or a box, in which a transmitter/receiver is placed such that it transmits signals towards an area, within which the teats of the animal can be expected to be found. The transmitted signal is received by the transponder, which in turn sends a signal, which is processed to contain data of the identity of the wearer of the transponder, to the receiver. Accordingly, the animal is now identified. Stored historical data regarding the location of the teats serve to roughly determine the location of the teats. Thereafter, the transponder is used as a position indicating means for determining the exact position of the teats, as described in connection with FIGS. 3 to 5.

FUNCTION

An animal, which is to be milked or treated in another way is firstly enticed to move to a stall predetermined for a certain kind of animals, e.g. cows. When the cow is in a desired position in the stall, the teats of a cow will be found—in a rough sense—within a certain area of the stall, outgoing from data regarding the breed or historical data of each cow, such as height and length of body, length of teats etc. Alternatively, a rough location of the teats may be performed by means of a video camera.

Thereafter, at least one teat is provided with a position indicating means, as discussed in connection with FIGS. 3 and 4.

Alternatively, at least one teat is already provided with a permanent position indicating means, as discussed in connection with FIG. 5.

The animal may now be inspected by means of the animal related means 7 in the form of a video camera as shown in FIG. 1b moved by means of the actuation means 5 in order to allow determination of the cleanliness of the teats 2, or even of the whole udder, if needed. Other controls may also be performed by means of the video camera.

Before milking, the teats 2 might need to be cleaned. This may be performed by means of the animal related means 7 in the form of a cleaning means like the one shown in FIG. 1c. Before cleaning, a position indicating means is applied to the teats 2, unless there are still position indicating means 1 left on the teats. After cleaning, there might exist need for further application onto the teats of a position indicating means 1, depending on the kind used.

In order to perform a milking operation, the animal related means 7 in the form of one or more teatcups, as shown in figures 1a and 2 are to be moved towards the teats. Accordingly, the sensing means 8 sends a signal regarding the position of the previously applied position indicating means 1 to the control means 10, which processes the incoming signal and in turn sends an outgoing signal to the actuation means 5 to move the teatcup or teatcups towards the teats 2. This sequence is repeated until each teatcup has been attached to all relevant teats—sometimes, not all quarters of the udder should be milked and therefore one or several teats may not need a teatcup applied. The milking operation starts immediately when each teatcup has been applied to the relevant teat.

After finished milking, it is desirable to perform after-treatment of the teats. This may be done by means of the spray-nozzle shown in FIG. 1d, the dip bowl shown in FIG. 1e or a dip flask, which is moved by means of the actuation means 5 towards the teats 2 and iodine or the like is applied onto the teats 2. Before cleaning, a position indicating means is applied to the teats 2, unless there is still position indicating means 1—depending on the kind used—left on the teats.

After finished milking or after the after-treatment it may be desirable to inspect the teats 2 by means of the animal related means 7 in the form of the video camera shown in FIG. 1b, which video camera is moved in relation to the udder by means of the actuation means 5. Before doing this, there might be needed further application onto the teats of a position indicating means 1, depending on the kind used.

As discussed above, also other animal related means than means related to the udder may be used to perform an animal related activity. Before performing such an activity, the location of said position indicating means is sensed whereafter said activity—such as killing or brushing the animal—is performed.

Accordingly, it is preferable—depending on the kind of position indicating means used—to check the need for application of a position indicating means before said animal related means is moved in relation to the body.

It should be noted that it may be possible to apply a position indicating means 1 to solely one teat in order to find all the teats, since the control means may have historical data stored concerning each animal regarding the inter-relationship of the teats, i.e. the distances, the angles, the lengths etc.

It should also be noted that the gripping means may either comprise two static members spaced apart by an interspace, or two members movable in the same manner as a lobster pincers.

What is claimed is:

1. An apparatus for automatically moving at least one animal-related means in relation to the body of an animal having an udder, said apparatus comprising:
    a sensing means comprising an electric charge sensor;
    a control means;
    an actuation means; and
    a position indicating means comprising an ionized liquid for application to at least one teat of the udder and adapted to be applied to the teat in such a way that it remains only temporarily on the teat,
    wherein said electric charge sensor is adapted to sense a position of said position indicating means, said control means is adapted to be responsive to a signal from said sensing means regarding said position, and said actuation means is adapted to move said animal related means in addition to said body in response to a signal from said control means.

2. An apparatus according to claim 1, wherein said animal related means is a video camera.

3. An apparatus according to claim 1, wherein said animal related means is a cleaning device.

4. An apparatus according to claim 1, wherein said animal related means is a teat after-treatment means.

5. An apparatus according to claim 1, wherein said animal related means is at least one teat cup.

6. An apparatus according to claim 1, wherein said actuation means is adapted to attach said teatcup onto said teat in response to a signal from said control means.

7. An apparatus for automatically moving at least one animal related means in relation to the body of an animal having an udder, said apparatus comprising:
    an olfactory sensor;
    a control means;
    an actuation means; and
    a position indicating means adapted for only temporary application to at least one teat of the udder,
    wherein said position indicating means is a smell producing substance, said olfactory sensor is adapted to sense a position of said position indicating means, said control means is adapted to be responsive to a signal from said olfactory sensor regarding said position, and said actuation means is adapted to move said animal related means in relation to said body in response to a signal from said control means.

8. An apparatus according to claim 7, wherein said olfactory sensor is a biosensor.

9. An apparatus according to claim 7, wherein said animal related means is a video camera.

10. An apparatus according to claim 7, wherein said animal related means is a cleaning device.

11. An apparatus according to claim 7, wherein said animal related means is a teat after-treatment means.

12. An apparatus according to claim 7, wherein said animal related means is at least one teat cup.

13. An apparatus according to claim 7, wherein said actuation means is adapted to attach said teatcup onto said teat in response to a signal from said control means.

14. An apparatus for automatically moving at least one animal related means in relation to the body of an animal having an udder, said apparatus comprising:
    a sensing means;
    a control means;
    an actuation means; and
    a position indicating means adapted for only temporary application to at least one teat of the udder, wherein said position indicating means comprises liquid water,
    wherein said sensing means is adapted to sense a position of said position indicating means, said control means is adapted to be responsive to a signal from said sensing means regarding said position, and said actuation means is adapted to move said animal related means in relation to said body in response to a signal from said control means.

15. An apparatus according to claim 14, wherein said animal related means is a video camera.

16. An apparatus according to claim 14, wherein said animal related means is a cleaning device.

17. An apparatus according to claim 14, wherein said animal related means is a teat after-treatment means.

18. An apparatus according to claim 14, wherein said animal related means is at least one teat cup.

19. An apparatus according to claim 14, wherein said actuation means is adapted to attach said teatcup onto said teat in response to a signal front said control means.

20. An apparatus according to claim 14, wherein said position indicating means consists essentially of liquid water.

21. An apparatus for automatically moving at least one animal related means in relation to the body of an animal having an udder, said apparatus comprising:
    a sensing means;
    a control means;
    an actuation means; and
    a position indicating means adapted for only temporary application to at least one teat of the udder, wherein said position indicating means comprises milk powder,
    wherein said sensing means is adapted to sense a position of said position indicating means, said control means is adapted to be responsive to a signal from said sensing means regarding said position, and said actuation means is adapted to move said animal related means in relation to said body in response to a signal from said control means.

22. An apparatus according to claim 21, wherein said animal related means is a video camera.

23. An apparatus according to claim 21, wherein said animal related means is a cleaning device.

24. An apparatus according to claim 21, wherein said animal related means is a teat after-treatment means.

25. An apparatus according to claim 21, wherein said animal related means is at least one teat cup.

26. An apparatus according to claim 21, wherein said actuation means is adapted to attach said teatcup onto said teat in response to a signal from said control means.

27. An apparatus according to claim 21, wherein said position indicating means consists essentially of milk powder.

28. An apparatus for automatically moving at least one animal related means in relation to the body of an animal having an udder, said apparatus comprising:
- a sensing means;
- a control means;
- an actuation means; and
- a position indicating means adapted for only temporary application to at least one teat of the udder, wherein said position indicating means comprises a fluorescent material, wherein said sensing means is adapted to sense a position of said position indicating means, said control means is adapted to be responsive to a signal from said sensing means regarding said position, and said actuation means is adapted to move said animal related means in relation to said body in response to a signal from said control means.

29. An apparatus according to claim 28, wherein said animal related means is a video camera.

30. An apparatus according to claim 28, wherein said animal related means is a cleaning device.

31. An apparatus according to claim 28, wherein said animal related means is a teat after-treatment means.

32. An apparatus according to claim 28, wherein said animal related means is at least one teat cup.

33. An apparatus according to claim 28, wherein said actuation means is adapted to attach said teatcup onto said teat in response to a signal from said control means.

* * * * *